Aug. 4, 1925.
J. W. DEVINE
1,548,583
APPARATUS FOR MANUFACTURING INNER TUBES FOR PNEUMATIC VEHICLE TIRES
Filed Feb. 23, 1924
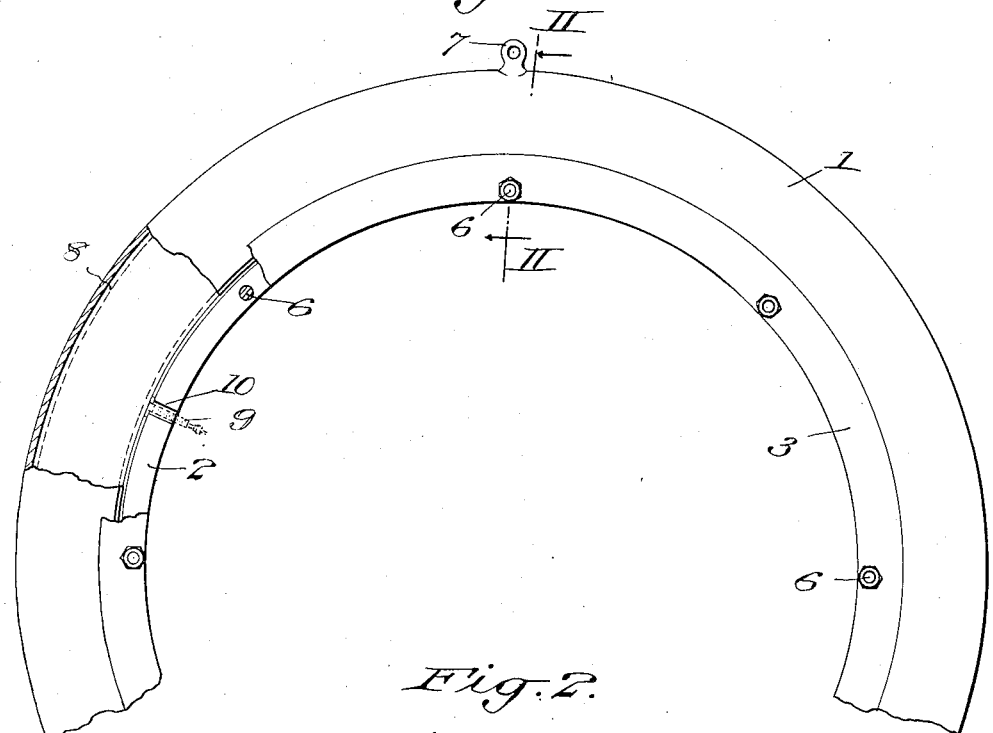
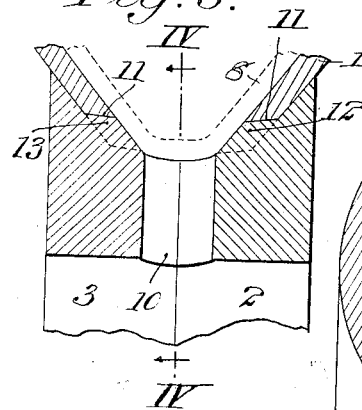
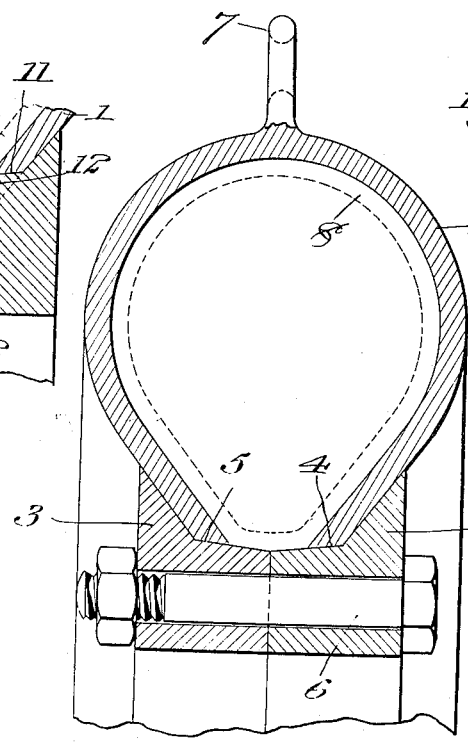
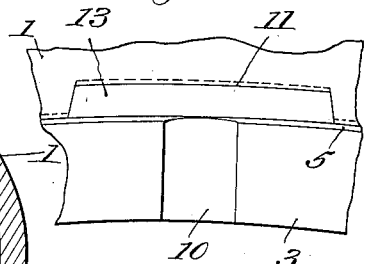
INVENTOR
James W. Devine
BY
his ATTORNEYS Patented Aug. 4, 1925.

1,548,583

UNITED STATES PATENT OFFICE.

JAMES W. DEVINE, OF NEWARK, NEW JERSEY.

APPARATUS FOR MANUFACTURING INNER TUBES FOR PNEUMATIC VEHICLE TIRES.

Application filed February 23, 1924. Serial No. 694,621.

*To all whom it may concern:*

Be it known that I, JAMES W. DEVINE, a citizen of the United States, and resident of Newark, in the county of Essex and State of New Jersey, have invented a new and useful Apparatus for Manufacturing Inner Tubes for Pneumatic Vehicle Tires, of which the following is a specification.

This invention relates to an apparatus and method for manufacturing inner tubes for pneumatic vehicle tires, and has for an object to provide such an apparatus and method which enable the tube to be vulcanized in substantially the shape it will assume when in use, both with respect to its circular form as a whole and its cross section contour or profile.

Another object consists in providing an apparatus of this character which is simple and cheap to manufacture, and a method which is easy and simple to perform.

Another object consists in providing an apparatus of this character which is light and may be expeditiously handled, both with respect to its assembly and disassembly, and its movement as a unit.

A further object consists in providing certain improvements in the form, construction and arrangement of the several parts of the apparatus, and in the steps of the method, whereby the above named and other objects may effectively be attained.

A practical embodiment of the apparatus is represented in the accompanying drawings, in which Fig. 1 represents a detail side view, partly broken away showing the apparatus with the tube therein.

Fig. 2 represents an enlarged transverse section taken in the plane of the line II—II of Fig. 1, looking in the direction of the arrows.

Fig. 3 represents an enlarged detail section taken in the plane of the line III—III of Fig. 1, looking in the direction of the arrows.

Fig. 4 represents a detail section taken in the plane of the line IV—IV of Fig. 3, looking in the direction of the arrows.

The apparatus comprises a hollow circular member 1 which is substantially pear-shaped in cross section and is open on its inner periphery, as clearly shown in Fig. 2. This member 1 may conveniently be composed of some drawn or rolled sheet metal, such for instance, as aluminum or steel; although it may, if desired, be cast or formed in any other well known or approved manner. The use of aluminum renders it very light and easy to handle, but steel will, naturally, be more durable.

It will be noted that the cross section shape of this member 1, which I have referred to as pear-shaped, is substantially that shape which a pneumatic tire, such for instance as an automobile tire, assumes when in place and inflated upon the vehicle wheel.

A pair of clamping rings 2, 3 are shaped to fit the inner circumference and inner side portions of the member 1, as clearly illustrated in Fig. 2, and it will be observed that the inner edges of the member 1 are tapered, as indicated at 4, 5, for sliding engagement with complementary portions of the clamping rings 2, 3, so as to enable the ready application to and withdrawal from operative position of said clamping rings. The rings extend a sufficient distance up along the sides of the member 1 so as to firmly clamp it and support it.

In order to hold the clamping rings 2, 3 in operative position, any suitable means may be employed but I have selected and illustrated a series of bolts 6. The inner faces of the clamping rings are machined so that they can abut each other with an accurate fit when the bolts 6 are drawn up, to firmly clamp the parts of the apparatus in operative assembly and also insure accuracy in the molding operation.

To facilitate handling, an eyelet 7 may be cast or otherwise secured upon the periphery of the member 1.

The tube is represented in dotted lines and marked 8.

In operation, the tube 8 is preferably formed from the usual plastic rubber compound by ejecting it from a tubing machine, or the like. This is particularly advantageous in forming tubes to be manufactured employing my improved apparatus and method, because the tubing machine die may be so shaped as to impart to the tube its final cross sectional shape in which it is to be vulcanized and used. After the tube has been ejected from the tubing machine, it is cut off in suitable lengths and the ends skived and telescoped a slight distance, for the purpose of forming an endless tube. A suitable opening is then formed in the inner circumference of the tube, and the valve 9, together with its customary patch and fastening means, inserted and secured, all in a manner well understood to operatives in this industry.

The completely formed tube is then inserted in the member 1, which is separate from the rings 2, 3, by passing the tube through the open inner periphery of the member 1 in a manner quite analogous to that commonly employed in inserting a tube into an automobile tire casing. After the tube 8 has thus been inserted and accurately located in the member 1, the clamping rings 2, 3 are slid into position. The said rings are provided with suitable half round grooves 10 which, when the rings 2, 3 are in operative position, constitute an aperture through which the valve 9 may extend so as to project inwardly of the said rings. The bolts 6 are inserted and drawn down to firmly clamp the rings 2, 3 in position with respect to the member 1 and with respect to each other. Following this, a suitable fluid pressure, such as air, is supplied to the interior of the tube 8 through the valve 9 so as to cause the tube to lie smoothly and in proper shape against and throughout the interior of the member 1. Ordinarily ten pounds pressure will be sufficient for this purpose.

Following this operation, the entire apparatus, with the tube therein, may be slid on a supporting track, to which it is secured by the eyelet 7, into a suitable vulcanizer, one of the horizontal type being preferred, and cured or vulcanized as is well understood in this industry.

In order to provide room for the passage of the base of the valve 9 when inserting and removing the tube into and from the member 1, the inner edges of the member are cut away for a short distance to form a gap 11, and the rings 2, 3 are provided with shoulders 12, 13 that enter and fill said gap when the parts are in assembly.

The apparatus, by virtue of its construction and the lightness of its parts, is well adapted to be employed in a continuous series of operations during all of which the member 1 is supported from an overhead track. For instance, the member 1 may, by itself, be thus suspended and, in this position, the tube 8 be inserted therein by one or more operatives. The member 1 with its tube may then be pushed along the track until it comes opposite the station of another operative or other operatives, which latter may manually apply the clamping rings 2, 3 and bolt them in position. The assembled apparatus and tube may then be passed along to another station, where the fluid pressure is supplied and, finally, the whole may be pushed into the vulcanizer, as above mentioned. It will thus be seen that the apparatus not only enables the attainment of the desirable features hereinabove recited, but that it facilitates, in a general way, factory operations in the production of tubes, which is a matter of considerable importance, particularly owing to the fact that said tubes are commonly produced in comparatively great numbers.

The mold structure hereinabove described is so arranged that the only joint of the parts which are in engagement with the tube, is located at the base portion, where there is no movement of the tube when in use. Furthermore, in employing this apparatus, it is not necessary to turn the vulcanized tube inside out, as is the common practice when the tube is vulcanized on a pole or straight mandrel. This is of value because it enables the tube to be used with the inner and outer portions of the rubber in the same condition, with respect to compression or extension, as that in which vulcanization takes place. Additionally, it is perfectly feasible to form and mold a tube with a suitably thickened base portion, thereby obviating the necessity or desirability of employing flaps when the tube is in use.

The fact that the rings 2 and 3 are tapered at 4 and 5, as previously mentioned, as well as the fact that the inner edges of the member 1 are also tapered, provides these members with portions which slant toward their axes and this results in an advantageous function of the apparatus since, when pressure is exerted within the circular member by inflating the tube, such pressure tends to force the inner peripheral edges of the circular member laterally outwardly on the portions 4, 5 of the rings and thereby increase the tightness of the mutual engagement of the rings with the inner periphery of the circular member. This prevents the formation of fins or ridges on the rubber tube at the points where the rings meet the inner periphery of the circular member. Of course, any movement of the parts is very slight, but, if there is any appreciable play between the circular member and the rings, this shape of the cooperating parts will serve to take up the play and secure substantially perfect mutual engagement.

Finally, I would call attention to the fact that this apparatus and method are especially advantageous in connection with the manufacture of tubes for the so-called "balloon" tires which are, at this time, coming into very considerable use. These balloon tires, as is well known, have a relatively very great cross sectional area when considered with respect to their diameter, so that the difference in circumferential length of their inner and outer peripheries is extreme. When a tube of such dimensions is formed and vulcanized on a straight pole or mandrel, the curving of it into endless form necessarily produces either a great